United States Patent

[11] 3,578,780

[72] Inventor Norman J. Peters
   Fond Du Lac, Wis.
[21] Appl. No. 787,805
[22] Filed Dec. 30, 1968
[45] Patented May 18, 1971
[73] Assignee DEC International, Inc.
   Madison, Wis.

[54] APPARATUS FOR COMMINUTING MATERIALS
   16 Claims, 8 Drawing Figs.
[52] U.S. Cl. .................................................. 146/79,
   146/174
[51] Int. Cl. ..................................................... B02c 18/00,
   B26d 9/00
[50] Field of Search .......................................... 146/79, 76,
   174, 173

[56] References Cited
   UNITED STATES PATENTS
   362,971 5/1887 Jones............................ 146/174X
   1,443,535 1/1923 Holmquist..................... 146/174X
   2,142,649 1/1939 Lindley......................... 146/174
   3,217,765 11/1965 Anderson..................... 146/79X Primary Examiner—Willie G. Abercrombie
Attorney—Andrus, Sceales, Starke & Sawall ABSTRACT: An apparatus for comminuting and blending materials such as food products. The materials to be blended are initially fed into a shredder unit and the shredded materials are discharged to a comminuting or grinding unit.

The grinding unit includes a rotor which rotates within a perforated drum having a generally U-shaped cross section and open ends. The material is introduced into the drum through the longitudinally extending opening and is forced outwardly through the perforations by the rotor and discharged to a hopper.

The drum is adapted to be slipped longitudinally over the rotor and rotor bearings and is retained within a fixed cage. The drum can be readily removed from the unit without removing the rotor or disassembling the bearings for the rotor shaft.

Inventor
Norman J. Peters
By
Attorneys

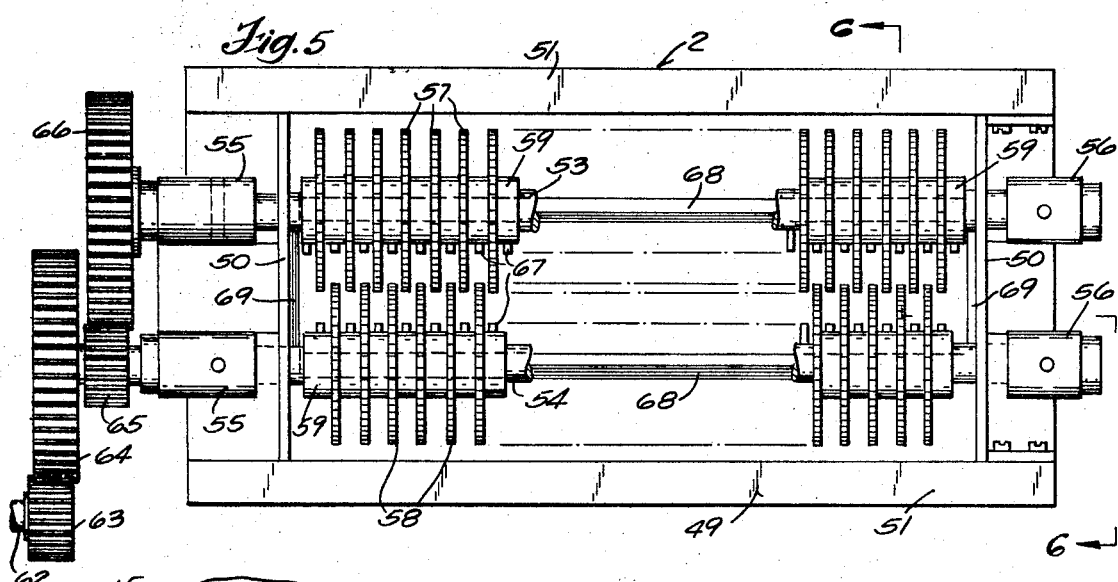
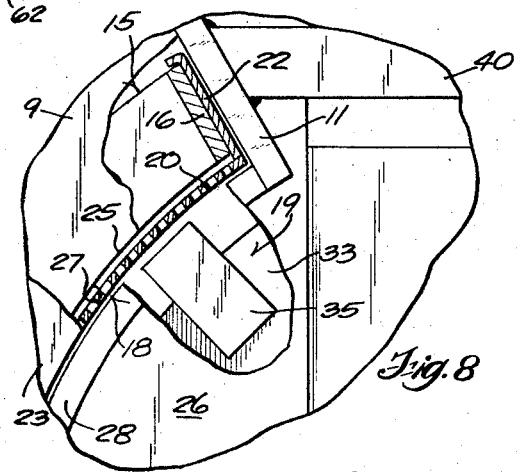
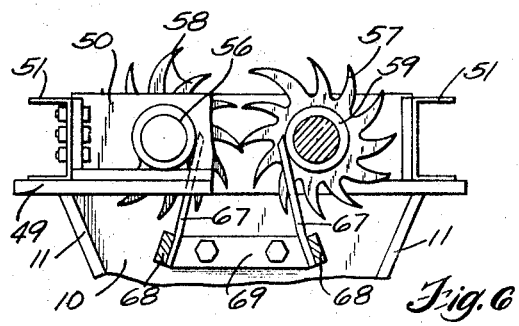
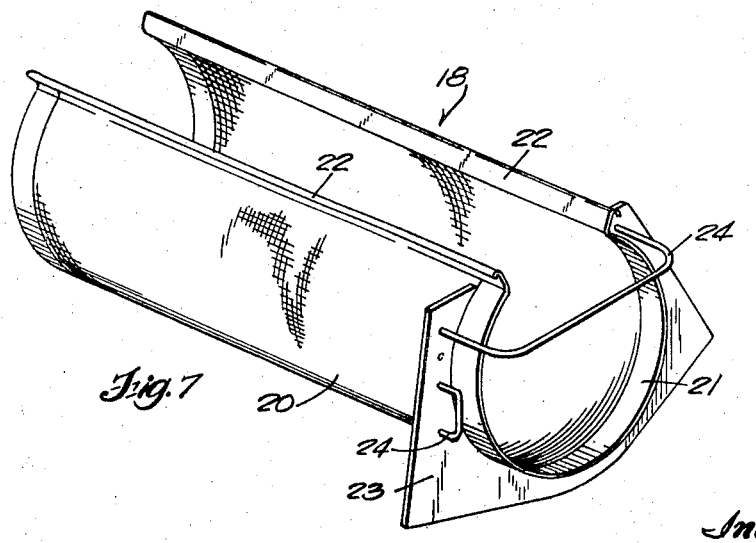

APPARATUS FOR COMMINUTING MATERIALS

This invention relates to an apparatus for comminuting and blending materials and more particularly to an apparatus for grinding and blending food products, such as cheese.

In the processed cheese industry, various varieties of natural cheese are blended together prior to cooking, while in other instances, ingredients such as whey powder, skim milk powder, pimento and the like are blended into the cheese. The conventional apparatus used in the cheese making industry for blending cheese includes a shredding unit consisting of two series of cooperating shredding discs which serve to shred or slice the cheese. The shredded cheese is then fed to a grinding or comminuting unit which includes a rotor mounted for rotation within a fixed perforated drum. Rotation of the rotor serves to force the cheese outwardly through the perforations of the drum and thereby not only communutes the cheese but blends the various cheeses together.

With a food product, such as cheese, strict sanitary requirements are enforced which necessitates cleaning the apparatus after each day's operation. To clean the unit, the drum should be removed so that both the rotor and drum can be thoroughly cleaned of the cheese. With the conventional grinding machine, this is not practical because of the length of time required to remove the rotor shaft bearing and the bolts which secure the perforated drum in place. With the conventional grinding machine, the drum is not ordinarily removed for cleaning and is normally removed only for repairs or replacement of parts. Therefore, the conventional grinding machine is usually not properly and completely cleaned.

As a further disadvantage, if the rotor of the conventional grinding machine stops or stalls, it cannot normally be started under full load, so that it has been necessary in the past to remove the top hopper and top shredder assembly and then scoop the cheese from the inside of the perforated drum so that the rotor can restart under no load or minimum load conditions.

The present invention is directed to an improved grinding apparatus for use in comminuting and blending food products such as cheese. The materials to be blended are fed into a shredder unit which acts to shred or slice the materials which are then discharged to the comminuting or grinding unit. The grinding unit includes a rotor which rotates within a perforated drum and the materials are forced outwardly through the perforations in the drum and discharged to a hopper.

In accordance with the invention, the drum is generally U-shaped in cross section and is provided with open ends. The drum is slipped longitudinally over the rotor and rotor shaft bearing assembly and is retained within a fixed cage. With this construction, the drum can be readily removed from the machine without removing any additional parts. The entire machine can be easily and thoroughly cleaned in a substantially shorter period of time and also more easily inspected as to cleanliness.

As a further advantage, if the rotor stalls and will not start under full load conditions, the drum can be readily removed from the machine, cleaned of cheese and replaced, so that the rotor can be restarted under minimum load conditions.

Other objects and advantages will appear in the course of the following description.

The drawings illustrate the best mode presently contemplated of carrying out the invention.

In the drawings:

FIG. 5 is a horizontal section taken along line 5—5 of FIG. 1 and showing the shredder rolls and drive;

FIG. 6 is a section taken on line 6—6 of FIG. 5;

FIG. 7 is a perspective view of the perforated drum; and

FIG. 8 is an enlarged fragmentary end view with parts broken in section showing the drum, rotor and cage.

Figure 1:
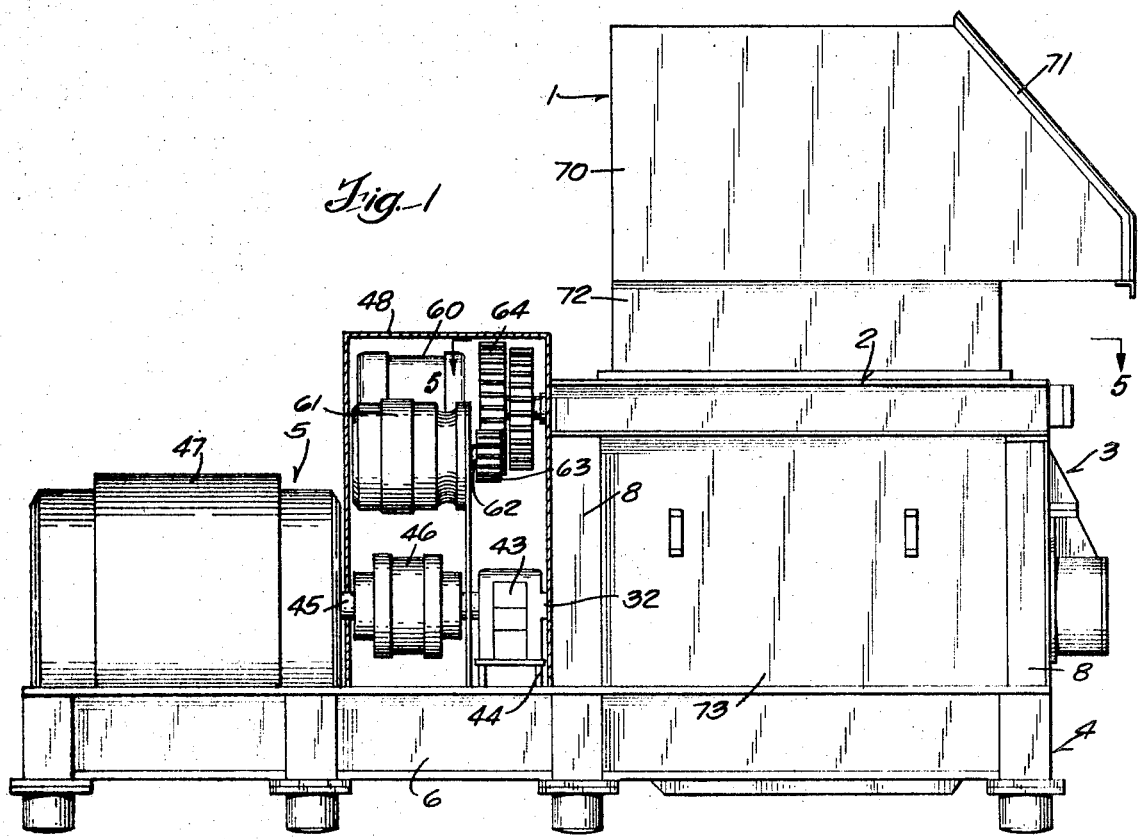
FIG. 1 is a side elevation of the grinding apparatus of the invention with parts broken away in section.
Figure 2:
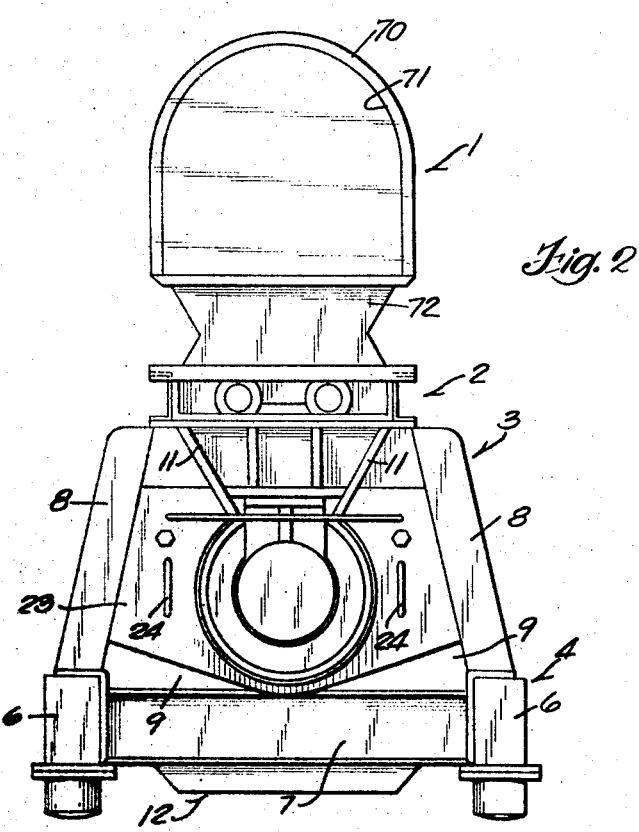
FIG. 2 is an end view of the apparatus shown in FIG. 1.
Figure 4:
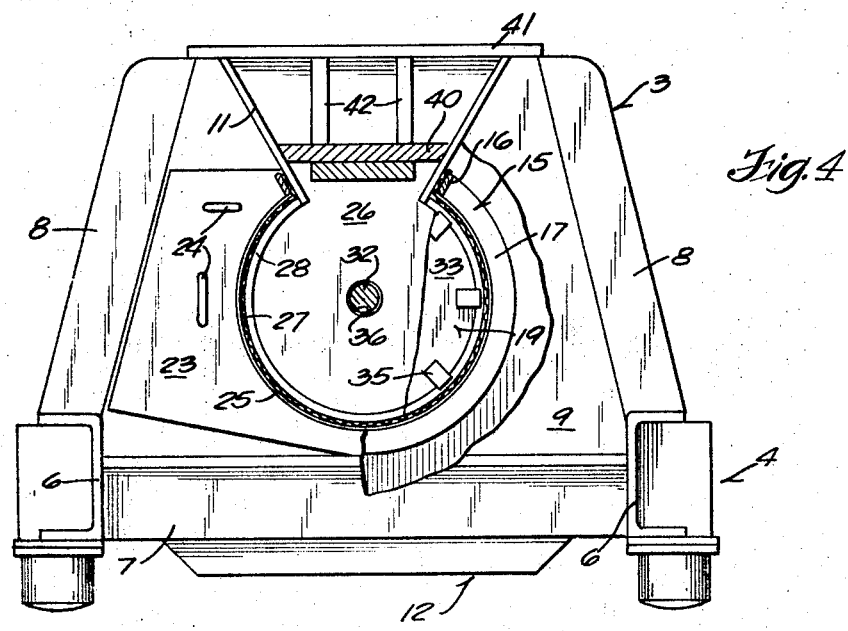
FIG. 4 is an enlarged end view of the grinding unit with parts broken away in section.

The drawings illustrate an apparatus for comminuting and blending materials such as food products. In general, the apparatus includes a hopper 1 which receives the materials to be blended and a shredding unit 2 is located beneath the hopper and receives the material from the hopper. The shredder unit 2 acts to crush or shred the materials, and the shredded material is then discharged to a grinding unit 3 which serves to comminute and blend the materials. The grinding assembly 3, shredding unit 2 and hopper 1 are mounted on a base frame 4, and both the shredder unit 2 and the grinding unit 3 are driven by a drive unit 5 which is also mounted on the frame 4.

As shown in FIG. 1, the frame 4 includes a pair of spaced longitudinal beams 6 which are connected at spaced intervals by a series of crossbeams 7.

The grinding unit 3 includes a pair of inclined supports 8 which extend upwardly from each longitudinal beam 6. The supports 8 at the front of the machine are connected together by a head 9, while the supports 8 at the rear of the machine are connected together by a head 10. Diagonal plates 11 are secured to the upper edges of the heads 9 and 10 and converge downwardly, thereby defining a hopper to receive and direct the shredded material from the shredder unit 2 to the grinding unit. The diagonal plates 11 extend substantially the entire length of the grinding unit and the ends of the plates 11 terminate generally in alignment with the outer edges of the supports 8.

The lower portion of the grinding unit 3 defines a hopper 12 through which the comminuted and blended material is discharged. Hopper 12 includes a pair of end plates 13, which are connected to the front and rear heads 9 and 10, respectively, and a pair of sideplates 14 which connect the edges of the end plates 13 together.

The grinding unit 3 also includes a fixed cage 15 of open construction. Cage 15 includes a series of longitudinal bars 16 and the ends of the bars are secured to the heads 9 and 10. In addition to bars 16, the cage 15 also includes a plurality of spaced, circumferential ribs 17 which are secured to the bars 16.

The cage 15 serves as an outer reinforcement for a perforated drum 18 which is located within the cage. A rotor 19 rotates within the drum 18 and acts to force the materials to be blended outwardly through the perforations in drum 18 and through the reinforcing cage 15, where it falls into the hopper 12. The material is then either discharged from the hopper 12 through an opening in the foundation or onto a conveyor system.

The drum 18, as best shown in FIG. 7, is provided with a generally U-shaped cross section, having a longitudinally extending inlet opening in the upper portion and open ends. The drum 18 includes a screen or perforated member 20 and the ends of the screen 20 are secured to U-shaped end members 21. A diagonally extending longitudinal support 22 is attached to each of the longitudinal edges of the screen and extends between the end members 21. As an alternate construction, the drum 18 can be a one-piece perforated member and the function would be identical.

As shown in FIG. 7, the forward end of the drum 18 is provided with a laterally extending plate 23 and handles 24 are secured to the plate and are adapted to be grasped by the operator to thereby withdraw the drum from the grinder unit 3.

According to the invention, the drum is adapted to be slipped longitudinally over the rotor 19 and therefore can be installed and withdrawn from the machine without removing the rotor nor disassembling the rotor bearings. To enable the drum 18 to be slipped onto the rotor 19, the inner edge 25 of front head 9 is provided with a generally circular contour to compliment the cross-sectional shape of the drum. An inner plate 26 is disposed in the same vertical plate as the head 9 and the outer edge of plate 26 is spaced inwardly from edge 25 to provide a generally U-shaped clearance or space 27 therebetween. The upper edges of plate 26 are attached to the diagonal plates 11, and a ring or flange 28 is secured to the central circular edge of plate 26 and extends forwardly from the plate. The drum 18 is adapted to be slipped through the clearance 27 and pushed into position on the rotor 19.

To properly align the drum 18 around the rotor 19, a flange 29 extends inwardly from the rear head 10 and the inner end of the drum 18 is adapted to fit around the flange 29 to thereby position the inner end of the drum in proper alignment with respect to the rotor 19 and cage 15. A plate 29a is secured to the outer edge of flange 29 to eliminate any inside ledge on which the cheese can lodge. The forward or outer end of the drum 18 is secured in proper alignment with respect to the rotor by a pair of studs 30 on head 9 which are received within openings in the end plate 23 on drum 18. By threading nuts 31 on studs 30, the plates 23 will be drawn tightly against the head 9 to thereby align and position the drum 18 with respect to the rotor.

The rotor 19 includes a horizontal shaft 32, and a series of generally circular plates 33 are secured at spaced intervals along the shaft 32. Two of the plates 33 are provided with hubs 34 and the hubs are keyed to the shaft 32.

A series of longitudinally extending bars 35 are welded within notches in the outer periphery of the plates 33 and during rotation of the rotor, the bars rotate in close proximity, approximately one-sixteenth inch, to the screen 20 of drum 18 and thereby act to force the cheese or other material contained within the drum outwardly through the perforations in the screen 20. The rotor bars 35 are centered so that the rotor can be driven in either direction to obtain maximum wear on the bars.

Figure 3:
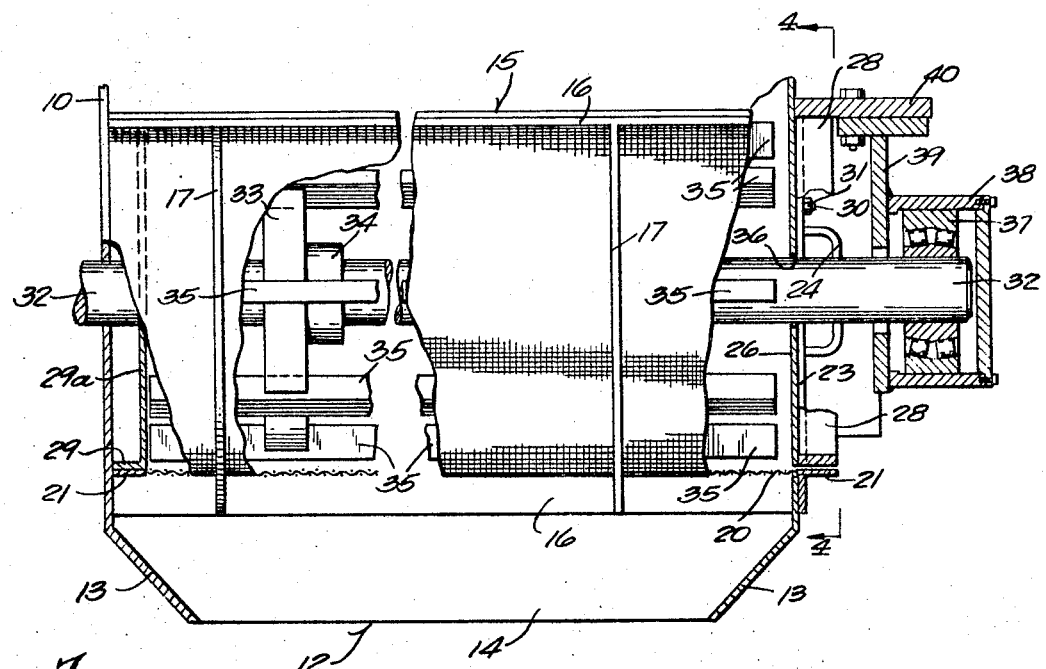
FIG. 3 is an enlarged fragmentary longitudinal section showing the drum, rotor and shaft bearing assembly.

The outer end of the rotor shaft 32 extends through an opening 36 in the plate 26, as shown in FIG. 3, and is journaled within a bearing assembly 37 housed within bearing housing 38. Bearing housing 38 is secured to a mounting bracket 39 and the upper edge of bracket 39 is bolted to a horizontal plate 40 which extends outwardly from the plate 26.

To reinforce the bearing mounting structure, a plate 41 is secured to the upper edges of the head 9, plate 26 and supports 8, and a series of webs 42 extend between the horizontal plate 40 and the plate 41.

The inner end of the rotor shaft 32 extends through an opening in the rear head 10 and is journaled within a bearing 43 carried on a platform 44 secured to frame 4. The end of the rotor shaft 32 is joined to a motor drive shaft 45 by a coupling 46 and motor shaft 45 is driven by motor 47 of drive unit 5 which is mounted on the frame 4. The coupling 46, as well as the bearing 43, are housed in a casing 48. With this drive system, operation of the motor 47 acts to rotate the rotor 19, and rotation of the rotor bars 35 serves to force the cheese or other material outwardly through the perforations in the drum 18. The material passing though drum 18 falls into the hopper 12. If the materials to be blended are relatively moist they will be extruded through the perforations in the drum 18 in long spaghettilike strands. On the other hand, if the materials are relatively dry, they will be discharged through the perforations in the drum 18 as finely divided material.

The shredder unit 2, which initially shreds or crushes the material and delivers it to the grinder unit 3, includes a frame 49 including a pair of end members 50 and a pair of channel-shaped side members 51 which are connected to the ends of the end plates 50. A pair of shafts 53 and 54 extend within the frame parallel to the side channels 51 and the corresponding ends of shafts 53 and 54 extend through one of the end plates 50 and are journaled within bearings 55, while the corresponding opposite ends of shafts 53 and 54 extend through openings in the other end plate 50 and are journaled within bearings 56.

The shaft 53 carries a series of spaced, toothlike discs 57, while the shaft 54 carries a similar series of cooperating discs 58. The discs 57 and 58 are adapted to rotate in the direction of the arrows in FIG. 6 and each disc is provided with a series of teeth 59 which are curved in the direction of rotation of the disc. Rotation of the discs 57 and 58 acts to shred or cut the material and the shredded material then falls downwardly in the grinding unit 3. One tooth 59a of each disc has a greater length than the remaining teeth and aids in drawing the cheese downwardly into the cooperating discs.

The cooperating discs 57 and 58 are driven by a motor 60 located within the casing 48. Motor 60 drives a transmission 61 and the output shaft 62 of transmission 61 carries a gear 63 which meshes with a gear 64 on shaft 54. In addition, the shaft 54 carries a gear 65 which engages a gear 66 on shaft 53. With this gearing, the shaft 54 operates at a faster speed than the shaft 53.

To aid in removing the cheese or other material from the shredding discs, a series of stripper fingers 67 are located between the adjacent discs 57 and 58. Each set of strippers 67 is carried by a horizontal support 68, and supports 68 are connected by cross supports 69. The cross supports 69 are secured to the plate 26 and rear head 10 so that the stripper assembly is located within the throat defined by the inclined plates 11. Each of the strippers 67 is located between a pair of adjacent discs and serves to remove or strip the material from between the discs as the discs rotate.

The hopper 1 includes a large upper end portion 70 which is provided with an inlet 71 through which the materials to be blended are introduced. The upper end 70 communicates through a throat 72 with the upper end of the shredder unit 2.

In operation, the cheese or other materials to be blended are introduced into the hopper 1 through the inlet 71 and pass downwardly through the throat 72 into the shredder unit 2 where they are crushed or shredded by the cooperating discs 57 and 58. The shredded material is discharged through the throat or hopper defined by the diagonal plates 11 into the grinding unit 3. The grinding unit, in effect, comprises a closed chamber defined by the heads 9 and 10 and removable sideplates 73 which are attached between supports 8.

The material discharged from the shredder unit passes through the longitudinal opening in drum 18, defined by the edge supports 22, to the interior of the drum. The rotor bars 35 act to beat or force the material outwardly through the perforations in the screen 20, and the material then falls into the hopper 12.

With the construction of the invention, the bearing assembly 37 for the outer end of the rotor shaft 32 is carried from above by the plate 40 attached to plate 26, and the slot or clearance 27 is shaped in conformity to the cross section of the drum 18 so that the drum can be slipped longitudinally through the clearance 27 into position around the rotor 19 without interference from the bearing assembly. The inner end of the drum is automatically aligned by engagement of the end of the drum with the flange 29. In addition, the longitudinal reinforcements 22 of the drum are positioned within the spaces between the diagonal plates 11 and the longitudinal bars 16 of the cage 15 and this also serves to maintain precise alignment of the drum.

The drum can be readily removed and replaced without disturbing or disassembling any other parts of the machine. However, the side covers 73 can be removed for visibility and inspection. As previously mentioned, it is necessary to clean the entire machine after each operation, and with the machine of the invention, the drum can be readily slipped from the rotor without the need for disassembling other components.

The invention has an additional advantage in that if the rotor stalls, the drum can be readily withdrawn and the load removed from the rotor and drum. When the drum is replaced, the rotor can then be restarted under no-load conditions. With a conventional unit, it would be necessary to remove the top hopper and shredder unit and scoop out the cheese to relieve the load.

The components of the machine in the product zone are welded, thereby eliminating crevices or ledges and facilitating the cleaning operation.

While the above description has been directed to the comminuting and blending of cheese products, it is contemplated that the apparatus of the invention can be employed to comminute, grind or blend any type of product or material.

I claim:

1. In an apparatus for comminuting material, a vessel including an end wall, inlet means for introducing material to be comminuted into said vessel, outlet means for discharging comminuted material from said vessel, a rotor disposed within the vessel and including a rotor shaft, a partially cylindrical drum disposed outwardly of the rotor and having open ends and a longitudinal opening extending the length thereof disposed in alignment with said inlet means whereby the material is introduced through said inlet means into said drum, said drum having a perforated surface, said end wall having an aperture to receive the rotor shaft and having a partially circular slot located radially outward of said aperture to complement and receive said drum whereby said drum can be inserted and withdrawn from the vessel through said slot, and a cage of open construction located outwardly of said drum and disposed to support said drum, said cage being spaced inwardly from the wall of the vessel, said cage and drum having cooperating guide means for guiding the drum in insertion and withdrawal from said vessel, rotation of said rotor forcing the material through the perforations in said drum and discharging the material to said outlet means.

2. The apparatus of claim 1, and including shredder means for initially shredding said material, and means for delivering the shredded material to said inlet means.

3. The apparatus of claim 2, wherein said shredder means comprises two sets of cooperating rotatable cutting discs.

4. The apparatus of claim 3, and including stripper means located between adjacent discs of each series to strip the material from between said adjacent discs.

5. The apparatus of claim 1, wherein said rotor comprises a plurality of generally parallel longitudinally extending bars disposed to rotate in close proximity to said perforated member.

6. In an apparatus for comminuting material, a vessel including a first end wall and a second opposed end wall, inlet means disposed between said end walls for introducing material into said vessel, outlet means for discharging comminuted material from said vessel, a rotor disposed within the vessel and including a rotor shaft having an end projecting through said first end wall, bearing means located outside of said vessel and spaced axially from the first end wall for journaling said end of said shaft, support means for supporting said bearing means from said vessel, said support means extending generally vertically from said bearing means, said first end wall having a generally U-shaped slot spaced radially outward from said shaft, a perforated member having a generally U-shaped cross section corresponding to the shape of the slot, said perforated member disposed within the slot and extending between said end walls, means defining a handle connected to a first end of said perforated member and located on the exterior of said first end wall in position to be grasped by an operator to thereby withdraw said perforated member from said slot, and means for rotating said rotor to force the material through the perforations in said perforated member and discharge the material to the outlet means.

7. The apparatus of claim 6, wherein said U-shaped perforated member extends through an arc greater than 180° and has a longitudinal opening extending the length of the member, said opening being disposed in alignment with said support means whereby said perforated member can be inserted and withdrawn from said slot without interference from said support means and said bearing means.

8. The apparatus of claim 7, wherein the longitudinal opening in said perforated member extends upwardly and is in communication with said inlet means.

9. The apparatus of claim 6, and including aligning means projecting inwardly from said second end wall and arranged to engage the second end of said perforated member to maintain alignment of said second end of the perforated member with said rotor.

10. The apparatus of claim 6, and including shredder means for initially shredding said material, and means for delivering the shredded material to said inlet means.

11. The apparatus of claim 6, and including a plate extending laterally from the first end of said perforated member and disposed flatwise against the outer surface of said first end wall, and means for removably securing said plate to said first end wall.

12. The apparatus of claim 1, wherein said vessel includes a second end wall disposed in spaced relation to said first end wall and said apparatus including aligning means projecting from said second end wall in a direction toward said first end wall and disposed to be engaged by the corresponding end of said drum.

13. The apparatus of claim 1, wherein said aligning means is at least partially circular in shape and is received within said corresponding end of the drum.

14. The apparatus of claim 1, wherein said drum has a pair of spaced longitudinal edges bordering said longitudinal opening, and said cage includes guide members engageable with said edges for guiding said drum during insertion and removal from said slot.

15. The apparatus of claim 14, wherein said drum is provided with an outwardly extending flange on each of said longitudinal edges, and said guide members are longitudinally extending guide bars disposed within the vessel and disposed to be slidably engaged by said flanges.

16. The apparatus of claim 1, wherein the wall of the partially cylindrical drum extends through an arc greater then 180°.